United States Patent [19]

Lazaridis et al.

[11] Patent Number: 5,802,312
[45] Date of Patent: Sep. 1, 1998

[54] SYSTEM FOR TRANSMITTING DATA FILES BETWEEN COMPUTERS IN A WIRELESS ENVIRONMENT UTILIZING A FILE TRANSFER AGENT EXECUTING ON HOST SYSTEM

[75] Inventors: Mihal Lazaridis, Waterloo; Allan Lewis, Kitchener; Barry Gilhuly; Gary Mousseau, both of Waterloo, all of Canada

[73] Assignee: Research in Motion Limited, Waterloo, Canada

[21] Appl. No.: 312,835

[22] Filed: Sep. 27, 1994

[51] Int. Cl.$^6$ .................. G06F 9/00; G06F 15/16
[52] U.S. Cl. .................. 395/200.68; 395/200.32; 395/825; 395/829; 340/825.72
[58] Field of Search .................. 395/2.1, 200.01, 395/200.68, 200.2, 825, 829, 200.32; 340/825.72

[56] References Cited

U.S. PATENT DOCUMENTS

| | | | |
|---|---|---|---|
| 4,642,758 | 2/1987 | Teng | 364/200 |
| 4,905,003 | 2/1990 | Helferich | 341/110 |
| 5,133,053 | 7/1992 | Johnson et al. | 395/200 |
| 5,157,763 | 10/1992 | Peters et al. | 395/157 |
| 5,303,343 | 4/1994 | Ohya et al. | 395/200 |
| 5,335,276 | 8/1994 | Thompson et al. | 380/21 |
| 5,359,698 | 10/1994 | Goldberg et al. | 395/2.1 |
| 5,379,291 | 1/1995 | Herzberg et al. | 370/85.5 |
| 5,438,565 | 8/1995 | Hemmady et al. | 370/60 |
| 5,513,242 | 4/1996 | Mukerjee et al. | 379/58 |

FOREIGN PATENT DOCUMENTS

| | | | |
|---|---|---|---|
| 0413074 | 2/1991 | European Pat. Off. | 15/16 |
| 0512174 | 11/1992 | European Pat. Off. | 29/6 |

OTHER PUBLICATIONS

Using UUCP and USENET, by Grace Todino & Dale Doughtery, Jul. 1990.
Data Communications, vol. 23, No. 5, Mar. 1994 New York US, pp. 75–80, XP 000432068 C.J.M. Mathias 'New LAN Gear Snaps Unseen Desktop Chains' see the whole document.

*Primary Examiner*—Thomas C. Lee
*Assistant Examiner*—Rehana Perveen
*Attorney, Agent, or Firm*—Jones, Day, Reavis & Pogue; Charles B. Meyer

[57] ABSTRACT

A method and system in a data communication environment enables the exchange of information between a plurality of software applications through a selected communication device, such as a radio frequency modem. Messages received by modem are stored as files intended for one of a plurality of applications, even if the destination application is not currently active. The method and system may utilize the file system of the transmitting location to provide the address of the receiving location by embedding the address in the path of the file to be transmitted.

60 Claims, 7 Drawing Sheets

SYSTEM FOR TRANSMITTING DATA FILES BETWEEN COMPUTERS IN A WIRELESS ENVIRONMENT UTILIZING A FILE TRANSFER AGENT EXECUTING ON HOST SYSTEM

TECHNICAL FIELD

This invention relates generally to data communication in a wireless environment and, in particular, to a method and system for enabling a general-purpose subscriber unit, such as a portable computer, to receive and transmit messages via a wireless network with no requirement for a direct real-time interface to the such network.

BACKGROUND OF THE INVENTION

In computer systems where each subscriber unit executes one or more application software packages that require the ability to exchange information across a communication network, it is desirable to provide a standard interface between multiple software applications and the communications network. Using traditional methods, each application requires a complete interface to such network before any message exchange across the network can take place. In many cases, normal communication software and communication protocols fail over radio frequency wireless networks because of delays and the non-standard methods of transmission. Network delays are aggravated when mobile devices roam in and out of network coverage. Because of the foregoing, software programmers must develop extensive experience in the particular wireless network for which their program is written.

This invention allows for a free exchange of information across a wireless network without requiring that an application using the invention contain any information about the network being used to deliver the messages. The only requirement is that the application contain or a user have access to the remote mobile address or addresses of the receiving party. The invention receives messages from other mobile devices without direct involvement of any application and utilizes the file system on the device running the invention as a common interface between the application and itself. Therefore, to use the invention an application developer utilizes normal file system calls to interact with any communication network, including wireless networks.

This invention addresses routing of files through four methods. The first method allows the application to prepare a command file containing the source and destination information following a specific format. Source files and their destinations may be located on a disk drive or in memory storage on the source device, and when transmitted, may be stored in similar locations on the destination devices. In a second method, the application adds a special address line to the transmission file containing a destination address. This special address line has the form "TO:" followed by a destination address. The third method allows the application to write the file to a subdirectory derived from the actual network address of the destination. In a Microsoft Windows™ and MS-DOS™ environment the directory name transmits an eight digit address and the directory name extension is utilized for other addressing information. To use the third method, a file must be placed in a subdirectory in an outbound directory area. The fourth method allows the invention to read files containing lists of file names and their associated paths to determine the location to which files are to be transmitted and from which files have been received by the invention.

SUMMARY OF THE INVENTION

The present invention has utility in facilitating file and message exchange between personal computers or personal communicating devices over a wireless data network. Messages are delivered by the program in the form of files to designated remote systems. The files are saved in a form particular to the physical computer and operating system running the invention and delivered to the remote computer system. In accordance with the invention, the receiving computer running the invention saves the incoming data in a file associated with the receiving computer and operating system thus enabling the applications on the receiving computer to read and process the information.

Each computer on a network has a single known address, an example of this in the preferred embodiment would be the Mobitex Access Number (MAN) used to address all fixed and roaming stations connected to the network. The present invention solves several problems posed by wireless data networks while simplifying the use of such networks.

An important aspect of the invention is the effect of removing the necessity for real-time network communication from any application using the invention. The problems solved by this innovation include: (a) the inability of traditional applications to exchange data in a wireless environment because of delays and link speeds encountered in wireless data networks, and (b) the difficulties encountered resulting from the lack of a common protocol between applications. The method and system disclosed and claimed address these problems by permitting applications to access a wireless network through a common interface utilizing the file system resident to, associated with or used by such applications.

Accordingly, one object of the invention is to use the destination or source network address to route messages and files. The problems solved by this innovation include:
(a) eliminating the need for the application to modify or change data to be sent to the remote system, and
(b) eliminating the need to create control files to deliver the data, without precluding the ability to use either method if desired.

The present invention comprises a computer program that operates on a prescribed combination of a personal computer and an operating system. A preferred embodiment runs on an IBM™ PC or compatible computer and includes an operating system that supports a Microsoft Windows™ operating environment such as the MS-DOS™ or Windows Nt™ operating systems.

The invention is divided into four software components, a Startup and Shutdown Processor, a Message Manager, a Send File Manager, and a Receive File Manager.

The Startup and Shutdown Processor is called through the startup and shutdown phase of the system (program) comprising the invention. As those skilled in the art will appreciate, depending on the operating system and machine upon which the system comprising the invention is operating, this processor can take different forms. The purpose of the processor is to allocate and initialize all those structures and system resources that are needed for the program to operate in its normal mode. When the program is terminated, the shutdown sequence will de-allocate all structures or system resources that have been allocated.

The Message Manager is a central location where all messages are received. These messages include timer events, user input and communication messages. Message recognition, message filtering and message assignment are performed by the Message Manager component.

The Send File Manager comprises two main components. One component detects new files to be sent to destination sites and the other main component maintains communication connections until all information to be transmitted to a particular destination site has been successfully transmitted. In a preferred embodiment, when the Send File Manager receives a Start Send Message, the Send File Manager scans (a) the outbound directory area to detect new files within subdirectories or (b) the outbound list file that is created by the invention. A Start Send Message may be generated by a periodic timer, a user request or another application sending a message or signal. The directory scan includes files within previously existing subdirectories or new files within newly created subdirectories. When a new subdirectory appears with a valid network address, it is examined for files to be transmitted. If a new transmission file is detected, then the Send File Manager moves the transmission file from its current subdirectory to a pending files directory.

The Send File Manager creates a linked list of all files destined to the same site on a first-in, first-out (FIFO) basis. This linked list is shared with the Receive File Manager. This allows a remote site to request a file from the Receive File Manager.

The Receive File Manager receives files and transfers those files to their destination. When a file is detected by the Receive File Manager, the local system resources and permissions are verified before the connection is accepted. Each message transferred across a wireless network has the source and destination address of the message contained in the header file. As stated in the preferred embodiment, the Mobitex™ network uses the Mobitex™ Access Number for this purpose. When the Receive File Manager has performed any required security and verification to determine that it can open and start saving the file, it proceeds to write the file to the inbound directory area of the invention. The inbound directory preferably contains at least one pending directory and a series of subdirectories whose names are associated with the addresses of the remote computer systems that have sent messages to the receiving system. When a file is received, the Receive File Manager saves it in a pending directory until the entire file is received without error. When the file is completely received, it is moved to a subdirectory name derived from the remote computer's network address or to a given directory specified by the sender and the file name, including its path, is appended to an inbound list file. Within the pending directory, if a filename conflict occurs, the conflict is resolved to ensure the files do not overwrite each other.

The present invention will result in a reduction of the costs associated with developing applications for wireless networks, particularly Mobitex™ applications. It will allow multiple applications from different software vendors to share the same network access device concurrently. It will significantly decrease the time to market for such applications and enable users to access a wide variety of networks at faster rates.

It is therefore an object of the present invention to provide a standard, seamless interface to a telecommunications environment, especially a wireless environment.

Another object of the invention is to provide a method that facilitates the transmission of a data file from one location to another through the use of information stored with the data file either as an associated command file or a header within the data file or derived from the file path name of the data file. The present invention accomplishes this object by scanning a memory location for outbound files to be transmitted to a remote location and using the presence of a valid outbound file as a signal to initiate the process of transmitting such file to the location derived from one of (a) the command file associated with the outbound file; (b) a header contained within the outbound file; or (c) the file path name of the outbound file.

Further objects and advantages of this invention will become more apparent in light of the following drawings and description of the preferred embodiment.

BRIEF DESCRIPTION OF THE DRAWINGS

The invention is pointed out with particularity in the appended claims. These, and other features of the invention will become more apparent and the invention will be best understood by referring to the following detailed description in conjunction with the accompanying drawings in which:

DETAILED DESCRIPTION OF A PREFERRED EMBODIMENT

Figure 1:
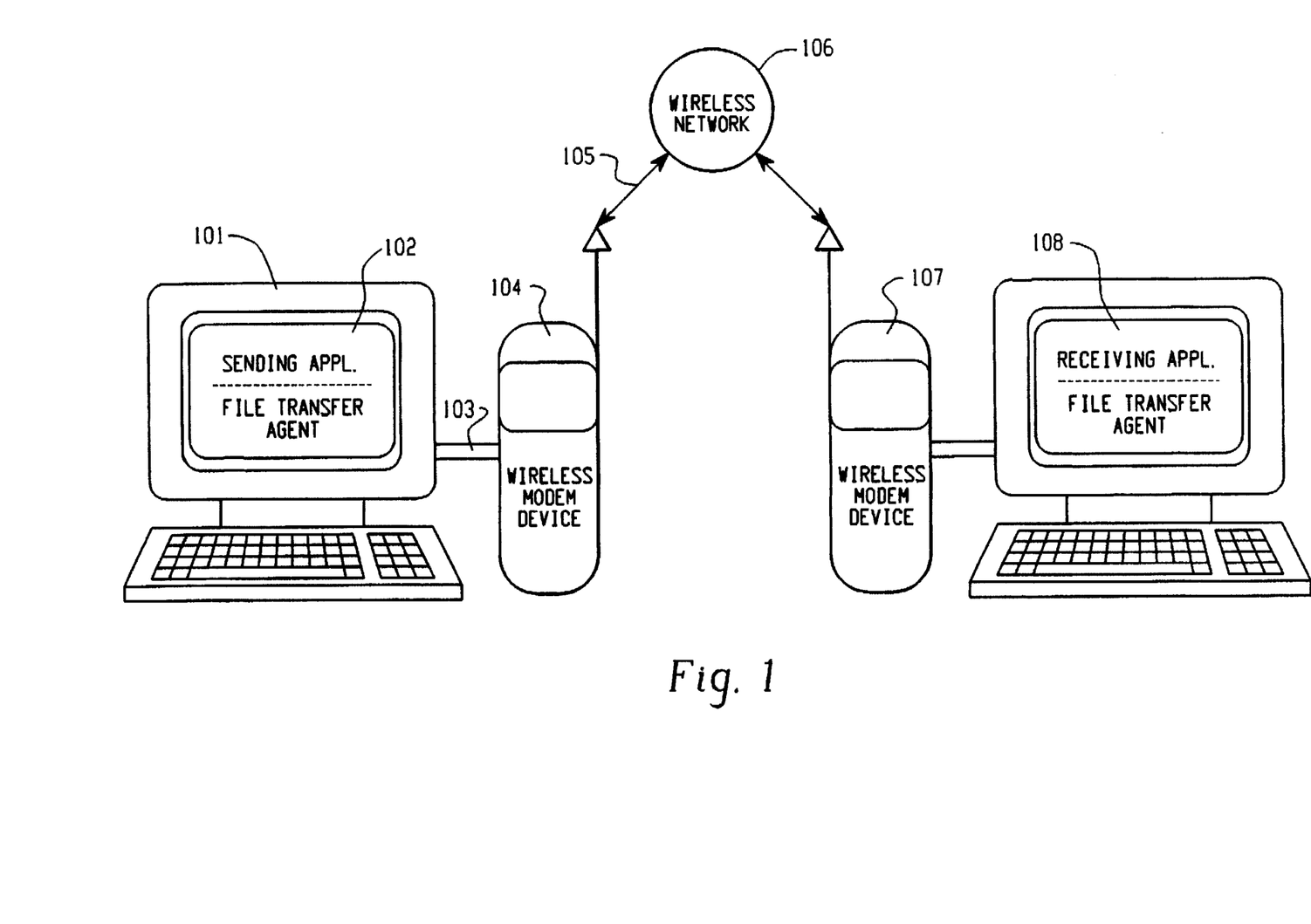
FIG. 1 is an overview of the system including the network and shows two systems, one acting as the sender and one acting as the receiver.

FIG. 1 shows an overview of how the invention is used in a network environment. In all data communications there are two computer systems involved in the creation of a connection over which an interaction takes place. One skilled in the art, however, would appreciate that the invention may be used on a single computer system to transfer files from one memory location to another. In the preferred embodiment, the sending computer (101) runs the Sending Application and the File Transfer Agent in send mode (102). This component initiates the connection which takes place over a serial/parallel connection (103) to a wireless modem/ network device (104). Those skilled in the art will appreciate that the modem device could be wired and the connection to the device could be serial, parallel or even a direct memory access to a built-in modem device. By use of the modem device, in this case using radio frequencies to communicate to the network, it transfers the information to the Wireless Network (106). The network routes the information to another similar modem device. The receiving Wireless Modem Device (107) passes the information via the File Transfer Agent to the Receiving Application (108). This end-to-end exchange causes information to be fully transferred and is the preferred method described herein. This diagram is a simplified diagram, and it should be noted that the applications within each computer can be both sending and receiving simultaneously. Also, it should be noted that the File Transfer Agent can be operating in a single computer system in both send and receive modes as shown in FIG. 2.

Figure 2:
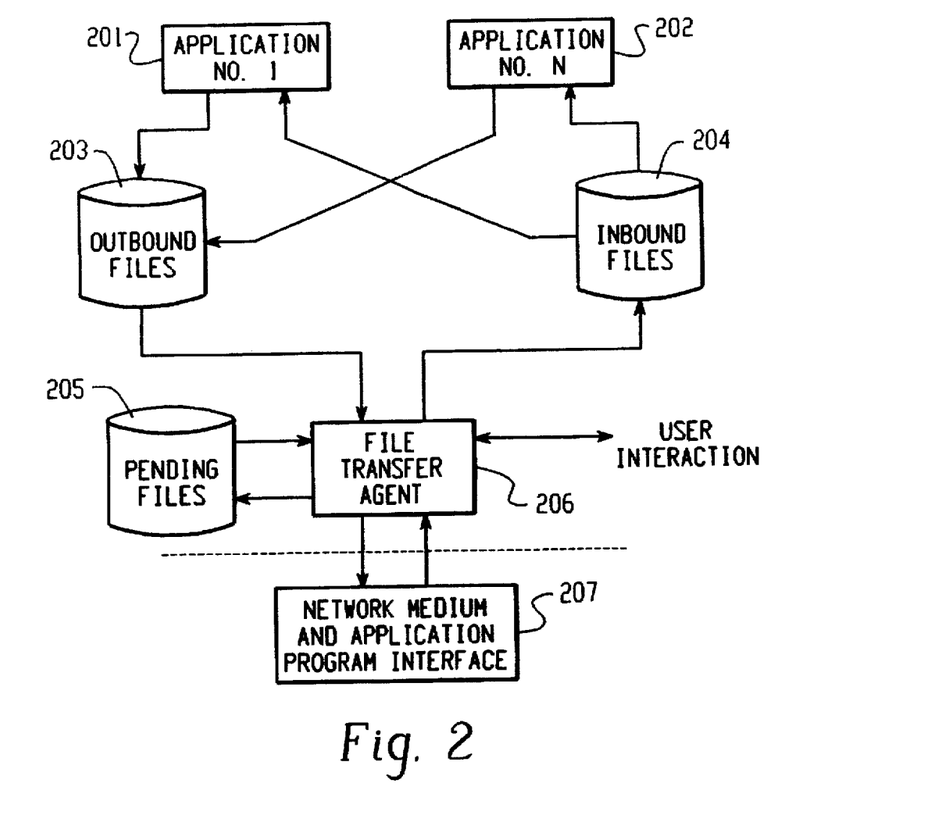
FIG. 2 is an overview of the invention within the computer using it, showing the main components involved.

FIG. 2 shows an overview of the preferred system in which the invention operates. It includes a number of active or inactive applications (201 and 202). These applications can be related, working together, or they can be performing their own independent activities. The interface between the applications and the File Transfer Agent (206) is through the normal file system of the computer system.

When an application sends data to a remote system, the application saves the data as a file in Outbound Files (203). Files of various sizes (from one byte to large graphics files that are many megabytes in size) are treated in the same manner by the File Transfer Agent (206). After the File Transfer Agent (206) has detected the presence of a file in Outbound Files (203), such file is moved from Outbound Files (203) to Pending Files (205) to ensure it is not inadvertently transmitted multiple times.

When the invention receives a file, it is stored temporarily in Pending Files (205) until it is completely received without error. The entire file is moved from Pending Files (205) to Inbound Files (204). Files in Inbound Files (204) are processed and deleted by the applications accessing such files.

In the preferred embodiment, the applications are Microsoft Windows™ programs reading and writing the files and the File Transfer Agent is running either in the background, or as a Windows™ program.

The File Transfer Agent operates as a Windows™ program, and provides a limited user interface. This interface provides configuration functions, monitoring functions and send file scanning functions. Its main work area is Pending Files (205). It uses Pending Files (205) as a storage area for files being transmitted and as a scratch area for files being received. The File Transfer Agent's (206) main purpose is to interact with the wireless network medium using any provided programming interface. This could be one specific network or several networks if several networks were all available to the program at the time of execution. The network used in the preferred embodiment is the Mobitex™ network. Mobitex™ is a radio frequency data network developed by Ericsson™ in Sweden and installed and operated by Roger's/Cantel™ in Canada and RAM Mobile Data™ in the U.S., U.K. and Australia.

Figure 3:
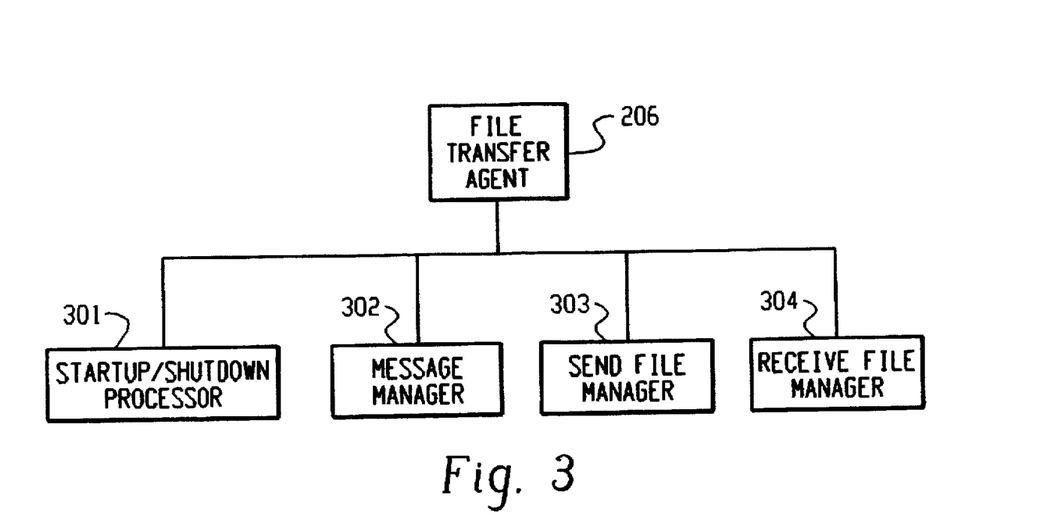
FIG. 3 is a block diagram of the File Transfer Agent, which comprises all main components of the system.

FIG. 3 shows a detailed block diagram of the File Transfer Agent (206). The File Transfer Agent (206) is level zero of all system components and as such contains all the major components of the invention. These major components include the Startup/Shutdown Processor (301), the Message Manager (302), the Send File Manager (303) and the Receive File Manager (304). It is these four components working together that provide the File Transfer Agent (206) with the ability to exchange files and respond to local system requests.

The Startup/Shutdown Processor (301) is the smallest of the components and is invoked only at system startup and system shutdown. During startup, user configuration information is read and interpreted. This includes configuring a site with characteristics, size limitations on files transmitted/received and directory permissions for files being written to the system. For all known sites, the Startup/Shutdown Processor allocates memory and establishes a site queue. During operation, when new sites send files to the system or when the File Transfer Agent (206) sends files to unconfigured sites, new site queues are allocated. Any additional required system resources, including system timers, system semaphores and other operating system-specific resources are allocated by the Startup/Shutdown Processor. The Startup/Shutdown processor also checks for the existence of the Outbound List File and the Inbound List File. If either file is not found, the file is created as a zero length file so that applications can access it.

When the system is terminated, the Startup/Shutdown Processor is invoked for shutdown. At this final stage, the Startup/Shutdown Processor de-allocates any memory in use by job records, session records and site queues. This final step ensures that all system resources including timers, semaphores and other operating system specific resources are de-allocated.

Figure 4:
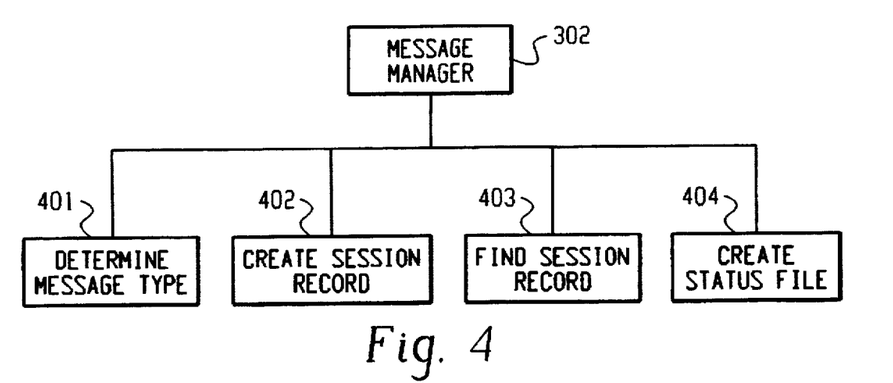
FIG. 4 is a block diagram of the Message Manager, which is responsible for filtering messages and is one of the four main components of the system.

FIG. 4 is a detailed block diagram of the Message Manager (302). Message Manager processes all incoming messages and creates or locates session records as needed, or updates a network status file. Message Manager is composed of four main modules. These are Determine Message Type (401), Create Session Record (402), Find Session Record (403) and Create Status File (404).

Determine Message Type (401) recognizes three types of start scan messages: (1) system timeout, (2) user instruction to scan and (3) application instruction to scan. Determine Message Type (401) returns a start sending message. The purpose of the scan is to detect that a file is present to send to a remote system. If the message is a communication message, then the invention scans for an OPEN_SESSION message because the system has no connection with the remote system. If the session record cannot be found then it must be discarded as in error.

---

DETERMINE MESSAGE TYPE

---

Extract Message Type and Class from Message
if Message Class equals System Message
    if (Msg_Type equals SYSTEM_TIMEOUT (OR)
        Msg_Type equals START_SCAN_NOW   (OR)
        Msg_Type equals API_START_SCAN)
        Action = Start_Sending;
    else if (Msg_Type equals Other System_Msg)
        Process as required
    end if
else if Message Class equals Communication Message
    if (Msg_Type equals OPEN_SESSION)
        Action = Call_Create_Session_Record;
    else if (Msg_Type equals Session_type_message)
        Action = Find_Session_Record;
    else if (Msg_Type equals Network_type_message)
        Action = Create_Status_File;
    end if
end if

---

Create Session Record (402) creates all required structures and saves information about the current connection for later use. Create Session Record (402), in the preferred embodiment, can be given a connection string that is used for validating the file to be received. After creating a session record, the Receive File Manager (304) is given this message to complete the processing. The following is the pseudocode for Create Session Record in the preferred embodiment:

```
CREATE SESSION RECORD

Determine Length of connection String
   (contains file and validation information)
Session_Record equals <ALLOCATE_MEMORY> (Size_Required)
if (Session_Record allocation successful)
      Save Connection string
      Save Source and Destination Addresses
      Action = FOR_RECEIVE_MANAGER;
else
      Action = Allocation_Failed;
end if
Return (Session_Record)
```

If the session record can not be created then the connection is rejected.

Find Session Record (403) is called when the communication message is not an OPEN_SESSION and an existing connection must be located. The following is the pseudocode for Find Session Record it the preferred embodiment:

```
FIND SESSION RECORD

Get Pointer to Site Queue for this Site
Get first Session_Record off Site Queue
Action = NO_ACTION;
while there are still Session_Records
      if (Session_Record.Source == Saved_Source (AND)
         Session_Record.Dest. == Saved Dest.)
            if (Job_Record within the Session Record is
               a Send Job)
                  Action = FOR_SEND_MANAGER;
            else
                  Action = FOR_RECEIVE_MANAGER;
            end if
            Break While Loop
      else
            Get Next Session_Record
      end if
end while
return (Session_Record)
```

Create Status File (404) is called by the Message Manager (302) when a communication message such as network availability, coverage or signal strength, as well as battery level indication is received. The Create Status File (404) module in the preferred embodiment has the following pseudocode:

```
CREATE STATUS FILE if (Message_Type equals Radio_Coverage)
      <Update Status File>
      Write_Line : COVERAGE = <X>
else it (Message_Type equals Network Lost)
      <Update Status File>
      Write Line : NETWORK = NOT_CONNECTED
else if (Message_Type equals Battery Level)
      <Update Status File>
      Write_Line : BATTERY_LEVEL = <Y>
end if
```

Create Status File (404) updates the status file to provide other applications with information about the system on which the invention is operating. One skilled in the art would appreciate that other status checks could be made part of the status file.

Figure 5:
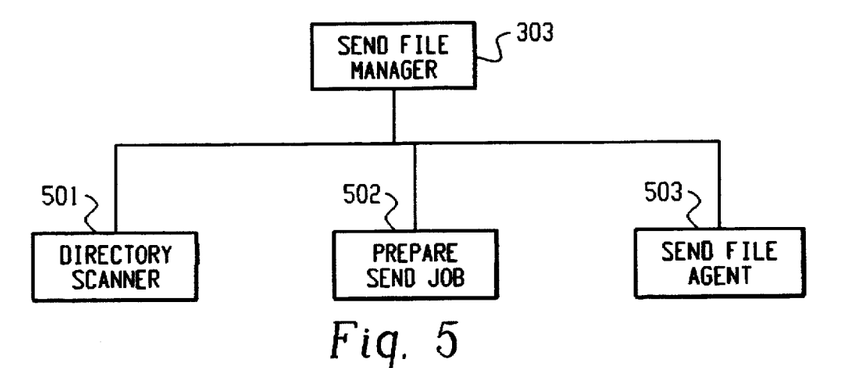
FIG. 5 is a block diagram of the Send File Manager, which is responsible for all locally initiated file exchanges and is one of the four main components of the system.

FIG. 5 is a detailed block diagram of the Send File Manager (303). This component is responsible for all file transfer jobs that are initiated locally. A local system can request that a file be sent to another system or received from another system. The Send File Manager (303) is composed of three main sub-modules: the Directory Scanner (501), Prepare Send Job (502) and Send File Agent (503).

The first component of Send File Manager (303) is the Directory Scanner (501). The Directory Scanner (501) is invoked when a start scan message is received from Message Manager (302). The Directory Scanner (501) component will scan three subareas for files to be transmitted. These subareas include: the command file subarea, the outbound directory, and any subdirectories in the outbound directory.

When a valid file is detected, Prepare Send Job (502) is called to create a job record and a job number for the request. The job number is used to create a temporary file name, used within Pending Files (205). The file is then moved from its current directory to a file in Pending Files (205). The Send File Agent (503) ensures the entire file is transmitted, and closes the connection when all information is sent.

Figure 6:
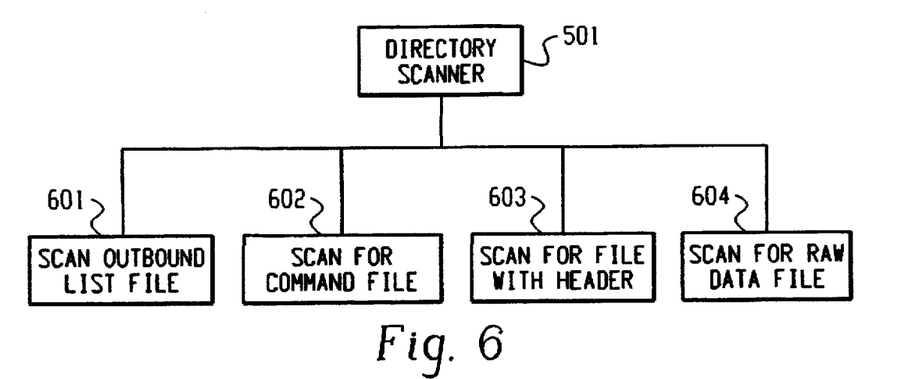
FIG. 6 is a block diagram of the Directory Scanner, which is responsible for initiating files to be sent to a remote system.

FIG. 6 is a detailed block diagram of the Directory Scanner (501) component within the Send File Manager (303). As described, the Directory Scanner (501) detects and validates files to be transmitted. It is invoked by a periodic timer, where the period is established by the user or a default, a user request, or a program sending a signal or message. The main components of the Directory Scanner (501) are the Scan Outbound List File (601), Scan For Command File (602), Scan For File With Header (603) and Scan For Raw Data File (604).

The first module, Scan Outbound List File (601), opens and reads the contents of an outbound list file containing a sequential list of all files to be transmitted. As an application indicates that a file is to be transmitted, the outbound list file is modified by appending the file name and path of the file to be transmitted to the outbound list on a first-in, first-out ("FIFO") basis. The pseudocode for the preferred embodiment follows:

```
SCAN OUTBOUND LIST FILE

<OPEN Outbound List File>
While (Not<End of File>)
      Read line of file
      verify file and pathname and other information
      if (file is located in Command Directory)
            Open file and read contents
            parse and verify syntax
            if <contents valid>
                  call <Prepare Send Job - 502>
            else
                  Invalid contents invalid - delete file
            end if
      else if (file is located in Outbound Directory)
            Open file and read contents
            if (Contents = "TO:Network_Address" (OR)
               Contents = "TO:Alias_Name")
                  parse and verify Network Address valid
                  or
                  Alias_Name valid
                  if <contents valid>
                        call <Prepare Send Job - (502)>
                  end if
            else
```

SCAN OUTBOUND LIST FILE

```
            file invalid, delete file
        end if
    else if (file is in an Outbound subdirectory)
        if (Directory_Name = valid network address
            (OR)
            Directory_Name = portion of valid network
                address (OR)
            Directory Name = valid Alias)
                OPEN Valid Subdirectory
                Filename = get first file in directory
                call <Prepare Send Job - (502)>
        else
            directory invalid, delete directory
        end if
    end if
end while
```

In the preferred embodiment, the user may configure the invention such that the presence of the Outbound List File allows the invention to bypass the other more time consuming scanning techniques outlined below. One of ordinary skill in the art would appreciate that the Outbound List File might also contain information associating a particular file with a particular transmission medium.

The second module, Scan For Command File (602), searches the command directory for files with specific filenames or file contents that contain parsable arguments. These arguments include parameters such as the destination network address, the local file name to be transmitted, the method of transmission and the destination file name and directory. The following is the pseudocode for the preferred embodiment of the Directory Scanner (501) module:

SCAN FOR COMMAND FILE

```
Open Command Directory
Filename = get first file in directory
while <files present in this directory>
    if <Filename == Name.CMD>
        Open file and read contents
        parse and verify syntax
        if <contents are valid>
            call <Prepare Send Job - (502)>
        else
            Invalid File Contents, Delete File
        end if
    else
        Invalid Filename, Delete File
    end if
    Filename = get next file in directory
end while
```

Scan For Command File (602) can queue several send jobs to multiple sites. One skilled in the art would appreciate that Prepare Send Job (502) is called for each job that has been validated.

The third module of Directory Scanner (501) is Scan For File With Header (603). This module scans the outbound directory, including all subdirectories within the outbound directory, for files with parsable headers. The header must contain the destination network address to delivery the file. In the preferred embodiment, the header line contains in its first line either "TO:Network_Address" or "TO:ALIAS_NAME" to identify the destination system, the latter formulation indicating that an alias name may be used to identify the destination as well. One skilled in the art will appreciate that an alias may identify, or point to the location of, a list of addresses where the data message must be sent. The pseudocode for the preferred embodiment of Scan For File With Header (603) is as follows:

SCAN FOR FILE WITH HEADER

```
Open Outbound Directory
Filename = get first file in directory
while <files present in this directory>
    Open file and read contents
    if (Contents == "TO:Network_Address"  (OR)
        Contents == "TO:ALIAS_NAME")
            parse and verify Network Address is in range
            or Alias Name matches known Network Alias
            Name
            if <contents are valid>
                call <Prepare Send Job - (502)>
            end if
    else
        file invalid, delete file
    end if
    Filename = get next file in directory
end while
```

The forth module of the Directory Scanner (501) is Scan For Raw Data File (604). This module allows a raw data file to be placed into a subdirectory in the outbound directory area targeted for transmission to a remote system. The destination address of the file is determined from the portion of the file path name beginning with the subdirectory. The subdirectory name, or several subdirectory names in the same file path name, contain the information necessary to construct a network address or a set of network addresses to route the file. In the preferred embodiment, the system determines whether the subdirectory name is either the network address of a destination site or and alias name for the destination address. Pseudocode for Scan For Raw Data File (604) for the preferred embodiment is as follows:

SCAN FOR RAW DATA FILE

```
Open Outbound Directory
Directory_Name = First Sub-Directory Name
While <Sub-Directories Present to Scan>
    if (Directory_Name == Valid Network Address  (OR)
        Directory_Name == Valid Portion of
                            Network Address  (OR)
        Directory_Name == Valid Alias for a
                            Network Address)
            Open Valid Sub-Directory
            Filename = get first file in directory
            while <files present in this directory>
                call <Prepare Send Job - (502)>
            end while
            directory emptied, delete directory
    else
        directory invalid, delete directory
    end if
    Directory_Name = get next Sub_Directory Name
end while
```

As Scan For Raw Data File (604) detects valid subdirectories, it removes all files present, and upon emptying a subdirectory or detecting it is invalid, deletes the directory to reduce overall scanning time.

Figure 7:
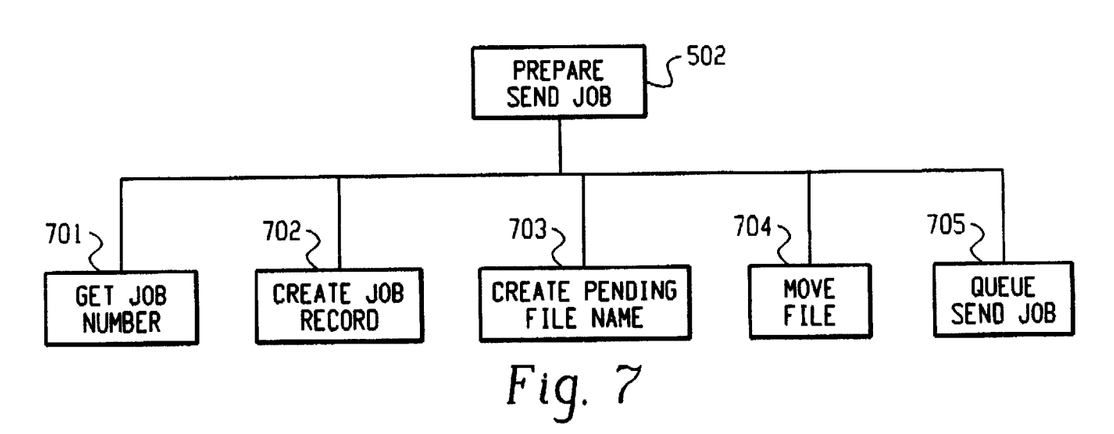
FIG. 7 is the block diagram of Prepare Send Job, which is responsible for preparing all information for a send job to take place.

FIG. 7 shows a detailed diagram of the Prepare Send Job (502) with its five components. The first component, Get Job Number (701) gets a job number for the current request, where a job number is an integer value. This number is generated for every new job in the system (send or receive), and is created to be unique for a long period of program execution time.

The second component of Prepare Send Job (502) is Create Job Record (702). A job record contains key information about a file transfer request. This information includes the newly created pending filename, the destination address and the destination file name. Pseudocode for the preferred embodiment of Create Job Record (702) is as follows:

```
CREATE JOB RECORD

Job_Record = Allocate Memory (Size of Job Record)
if (Job Record allocate successful)
    save information provided
    save site information
    save job number
end if
return (Job Record)
```

If the allocation fails, then Create Job Record (702) returns a null value for the job record and the send request is aborted.

The third module of Prepare Send Job (502) is Create Pending File Name (703). This name is used when moving a transmission file to the pending directory in the Pending Files (205). The name used within Pending Files (205) is derived from the Job Number just created. This name is saved in the job record so it can be referenced by other parts of the system. Those skilled in the art can appreciate that there are several ways a developer could create a unique temporary filename for the pending directory.

The fourth module, Move File (704), moves the file from the current directory into Pending Files (205). This move ensures that the moved file is not detected by the next pass of the software.

Finally, the fifth module, Queue Send Job (705), links a job record onto a Site Queue. Later, the job record is removed from the queue by the Send File Agent (503) to perform the work of transmitting the file. Sample pseudocode for Queue Send Job (705) in the preferred embodiment is as follows:

```
QUEUE SEND JOB

Get Global Site Queue Pointer
current site = get first site in the list
While (sites remaining in the site list)
    if (destination_site equal current site)
        link job record to site queue
        return value = successful;
        break while loop
    end if
    get next site in list of sites
end while
if (end of site list reached)
    new_site = allocate site queue (site_queue size)
    if (new_site allocation successful)
        link new_site into site list
        link job record to site queue
        return value = successful;
    else
        return value = failure;
    end if
end if
```

Figure 8:
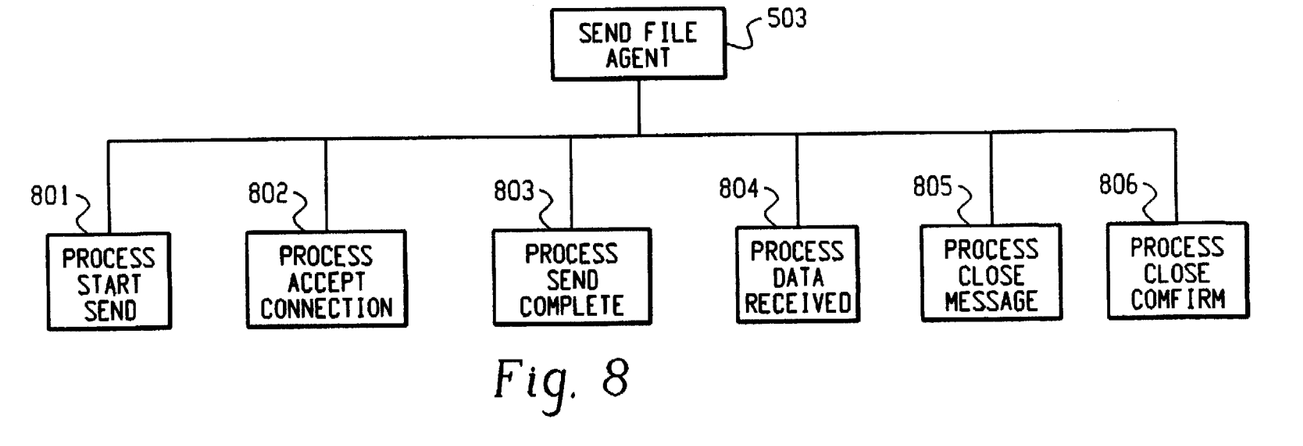
FIG. 8 is a block diagram of the Send File Agent, which is responsible for the actual data exchange with the remote system for sending a file.

FIG. 8 is a detailed block diagram of the Send File Agent (503). Send File Agent (503) processes all communications messages for send jobs and ensures the successful completion of file transmissions. One skilled in the art would appreciate that the messages transmitted would be compressed and/or encrypted using commercially available software. Send File Agent (503) is composed of six modules: Process Start Send (801), Process Accept Connection (802), Process Send Complete (803), Receive Data Check (804), Process Close Message (805) and Process Close Confirm (806).

The Process Start Send (801) receives an action, "Start Sending", from Determine Message Type (401). This action causes Process Start Send (801) to search for a new send jobs on the next site queue to be processed, and begins the entire file transfer process. Process Start Send (801) creates a session record and opens a session, unless a session already exists. If a session already exists, Process Start Send (801) determines that a remote site has requested a file. One of ordinary skill in the art would appreciate that a session to be opened would require the implementation of a network-dependant application program interface ("API") such as a Mobitex developer's kit commercially available from Research In Motion, Technology Business Park, 180 Columbia Street West, Waterloo, Ontario N2L 3L3 Canada, called the Mobilib-plus developer's kit, or an Eicon's developer's kit commercially available from Eicon Technologies Corporation, 2196-32nd Avenue (Lachine) Montreal, Quebec H8T 3H7 Canada. The pseudocode for the preferred embodiment of this module is as follows:

```
PROCESS START SEND site = first site in site list
While (more sites to be scanned exist)
    job_record = get first queued job record
    while (not at end of job record queue)
        if (Job_Record equals a send job   (AND)
            Job_Record does not exist)
            Mark Job_Record as Started;
            if (Session_Record does not exist)
                Create_Session_Record (402)
                <Open a session to remote site>
                Update Session Record - half open
                if (Requesting a file)
                    change record from send to
                        receive job record
                end if
            else
                read first portion of file
                if (Connection_Type equals full
                        protocol)
                    add check sum ("CRC") to
                        create total check sum
                    if (end of file)
                        place check sum ("CRC")
                            into portion read
                    end if
                end if
                send portion of file read
            end if
        end if
        job_record = get next job record
    end while
    site = get next site in site list
end while
```

The Process Start Send (801) module, in the preferred embodiment, scans all sites in the site queue list to ensure every pending send job causes a connection to be opened and a session record to be created. Those skilled in the art can appreciate that the queuing of work in the communications area could be limited to one outstanding send event at a time.

Process Accept Connection (802) ensures that the connection is accepted by the remote system and sends the first portion of the file to be transmitted. Process Accept Connection (802) also detects an end-of-file condition should such a condition exist in the first portion of the file. Pseudocode for the preferred embodiment of this module is provided as follows:

PROCESS ACCEPT CONNECTION

```
Mark Session Record as opened
if (Job Record is Send Job)
    read first portion of file
    if (Connection_type equals full protocol)
        create total file check sum ("CRC") for final
            message
        if (end of file)
            place check sum ("CRC") to end of block
                read
        end if
    end if
    send portion of file just read
end if
```

When the full protocol is being used, Process Accept Connection (802) creates a running total to validate the integrity of the file when it is fully received. When the receiver detects this check sum, it verifies its total matches and sends back a message indicating that all file information was received correctly.

Process Send Complete (803) receives a message every time a send is completed. This allows the communications subsystem to pace the data being sent to the remote so that data does not arrive at the communications link faster then the communications link can transmit such data. The pseudocode for the preferred embodiment this module is as follows:

PROCESS SEND COMPLETE

```
if (end of file)
    read next portion of file
    add check sum ("CRC") to current check sum file
        total
    if (end of file reached)
        place check sum ("CRC") to end of block read
    end if
    send portion of file just read
if (end of file                          (AND)
    not full protocol being used)
    close pending file
    delete pending file
    delete Job Record
    if (More Send Jobs present in Site Queue)
        build file header and send to remote
    else
        issue <Close_Connection Request>
    end if
end if
```

Receive Data Check (804) sends a message back to the sending system. This occurs only when the full protocol of the invention is being used. The pseudocode for the preferred embodiment of this module is as follow:

RECEIVE DATA CHECK

```
if (Data_Message equals all Data Received)
    close open pending file
    delete pending file
    delete Job Record
    if (More Send Jobs present in Site Queue)
        build file header and send to remote
    else
        issue <Close_Connection Request>
    end if
else
    if (Data in Error Message)
```

RECEIVE DATA CHECK

```
        retransmit bad block of data
    else
        <Unknown Message ignore>
    end if
end if
```

Receive Data Check (804) closes the connection when all data has been transmitted.

Process Close Message (805) handles close commands that are sent by the receiving system. This could occur if the remote system had an error or problem during operation. In that case, Process Close Message (805) closes any opened files and deletes any job or session records. It also sends a close confirm communication message back to the remote system.

Process Close Confirm (806) de-allocates to memory any job or session records related to this connection.

Figure 9:
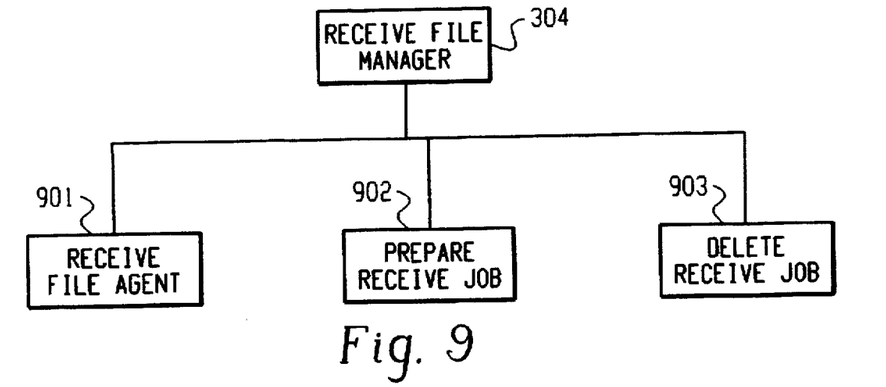
FIG. 9 is a block diagram of the Receive File Manager, which is responsible for all remotely initiated file exchanges and is one of the four main components of the system.

FIG. 9 is a detailed block diagram of the Receive File Manager (304). The main function of this module is to receive incoming connections and file information. Receive File Manager (304) is composed of three components: Receive File Agent (901), Prepare Receive Job (902) and Delete Receive Job (903).

Figure 10:
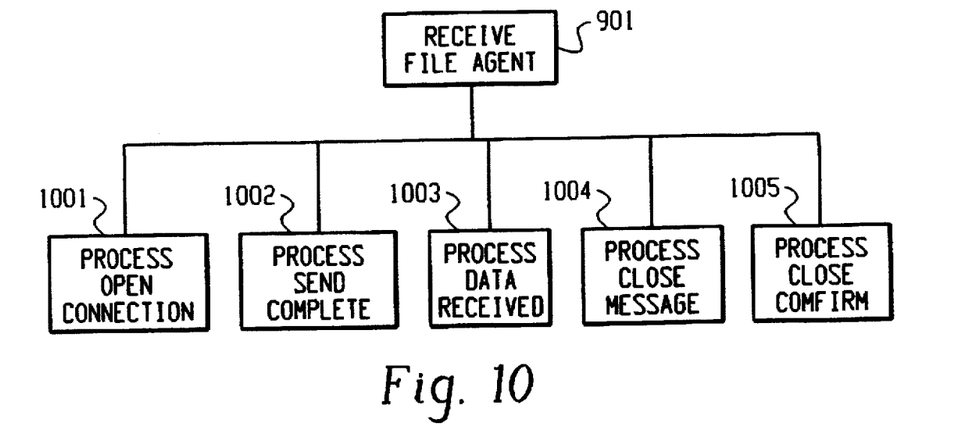
FIG. 10 is a block diagram of the Receive File Agent, which is responsible for the actual data exchange with the remote system for receiving a file.

FIG. 10 is a detailed block diagram of the Receive File Agent (901). This module processes all communication messages from remote systems. These communication messages are used to open new connections, transmit the data and close connections. Receive File Agent (901) is made up of five components: Process Open Connection (1001), Process Send Complete (1002), Send Data Check (1003), Process Close Message (1004) and Process Close Confirm (1005).

Process Open Connection (1001) accepts new connections from remote systems. This module validates the information contained within the connection request. In the preferred embodiment, this information is referred to as the presentation string. The presentation string provides a range of information unique to each sending system being utilized. In the preferred embodiment, the presentation string includes the destination filename, the size of the file, whether a file is being transmitted or requested and the type of protocol to use (for example express or confirm). When a file is requested, Prepare Send Job (502) is called. The pseudocode for this module in the preferred embodiment follows:

PROCESS OPEN CONNECTION

```
site = first site on list of site queues
while (not at end of list of site queues)
    if (site == New site to be opened)
        break while loop
    end if
end while
if (first connection initiated by this site)
    if (Parameters in Open Request within ranges
        allowed)
        call <Create Session Record>   (402)
        if (Open_Parameters is requesting a file)
            call <Prepare Send Job>   (502)
        else
            call <Prepare Receive Job>  (902)
        end if
        update session record with job information
```

-continued

PROCESS OPEN CONNECTION

```
    if (creation successful)
        <Send ACCEPT_COMMUNICATION_MESSAGE>
        (with expected presentation string)
        end if
    end if
end if
```

In the preferred embodiment, Process Open Connection (1001) can have only one connection open to one site for the purpose of receiving files. However, there may be another connection open to this same site for sending files.

Process Send Complete (1002) receives communication messages indicating that a previous send has been completed. This allows the communication system to pace data being transferred to another site. In the Receive File Agent (901), this message occurs after we have sent the "All Data Received" message to the originating system after the entire file has been sent and verified.

Send Data Check (1003) processes all incoming file data on each connection. This module recognizes the "End Of File" condition and checks whether the received cyclical redundancy check ("CRC") matches the running CRC total that is being kept on the file. The pseudocode for this module in the preferred embodiment follows:

SEND DATA CHECK

```
if (message equals File Data Message)
    write information to opened file
    add Check Sum ("CRC") to running total for file
    if (End Of File Indicator Present)
        close open pending file
        if (CRC.Local equals CRC.Received)
            call <Delete Receive Job> (903)
            if (Session_record_Protocol = Confirm)
                send "All File Received" message
            else
                send CLOSE_COMMUNICATION message
            end if
        else
            send error message to remote
            request re-transmission
        end if
    end if
else if (message equals start new file receive)
    call <Prepare Receive Job>
    send acknowledgment to start new file message
else
    unknown message received, ignore
end if
```

When the entire message is received Send Data Check (1003) calls Delete Receive Job (903) to delete the job record and move the received file to the destination directory.

Process Close Message (1004) handles close messages from remote systems. A close message is sent from the remote site after it has received the "All File Data Received" message from the transmitting system, or if some other error or problem has occurred. The close message signifies that the remote site has no more data to send. Process Close Message (1004) deletes the session record for this connection, and calls Delete Receive Job (903) to delete any jobs that may be linked on the site. Finally, the module responds to the close message with a close confirm message.

Process Close Confirm (1005) processes the response to a close message. This is received when the receiving site has issued a close and the initiating site has responded with a close confirmation. This module will delete the session record for the site and calls Delete Receive Job (903) to ensure all job records are deleted for the site.

Figure 11:
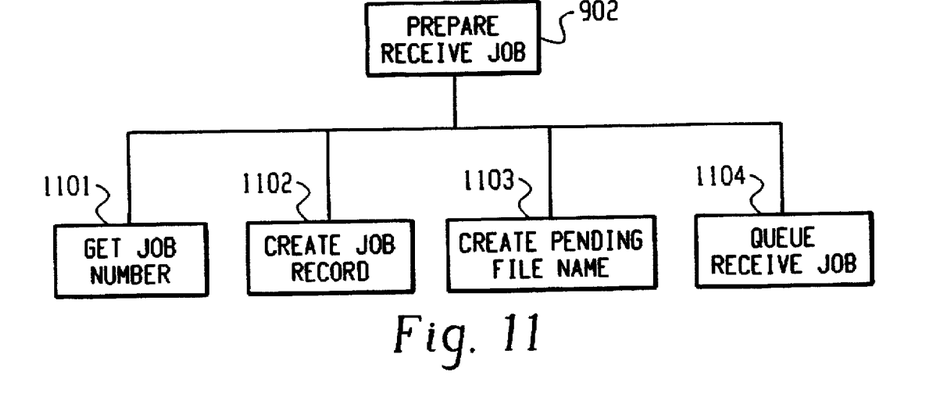
FIG. 11 is the block diagram of Prepare Receive Job, which is responsible for preparing all information for a receive job to take place.

FIG. 11 is a detailed block diagram of Prepare Receive Job (902). This module creates job information for all new connections. It is called after an OPEN_COMMUNICATION message is received and accepted. Prepare Receive Job (902) is composed of four components these are: Get Job Number (1101), Create Job Record (1102), Create Pending File Name (1103) and Queue Receive Job (1104).

Get Job Number (1101) designates an integer value. This number is generated for every new job in the system (send or receive) and is unique within a long period of program execution time.

Create Job Record (1102) creates a record that contains the Job Number, the pending filename, the destination address and the destination file name. Pseudocode for the Create Job Record (1102) in the preferred embodiment is as follows:

CREATE JOB RECORD

```
Job Record = Allocate Memory (Size of Job Record)
if (Job Record allocate successful)
    save information provided
    save site information
    save job number
end if
return (Job Record)
```

If the allocation fails, then the Create Job Record (1102) returns a null value for the job record and aborts the send request.

Create Pending File Name (1103) derives a temporary file name to be used as data arrives in from the remote system. The name is derived from the Job Number and the destination file name. This name is saved in the job record so it may be referenced by other parts of the system. Those skilled in the art will appreciate that there are several ways a developer could create a unique temporary filename for Pending Files (205).

Queue Receive Job (1104) queues the information necessary to link a receive job record to a Site Queue. The job record is used by other sections of the software to receive the file. Sample pseudocode for Queue Receive Job (1104) in the preferred embodiment is as follows:

QUEUE RECEIVE JOB

```
Get Global Site Queue Pointer
current site = get first site in the list
While (sites remaining in the site list)
    if (destination_site equal current site)
        link job record to site queue
        return value = successful;
        break while loop
    end if
    get next site in list of sites
end while
if (end of site list reached)
    new_site = allocate site queue (site_queue size)
    if (new_site allocation successful)
        link new_site into site list
        link job record to site queue
        return value = successful;
    else
```

```
QUEUE RECEIVE JOB return value = failure;
    end if
end if
```

Figure 12:
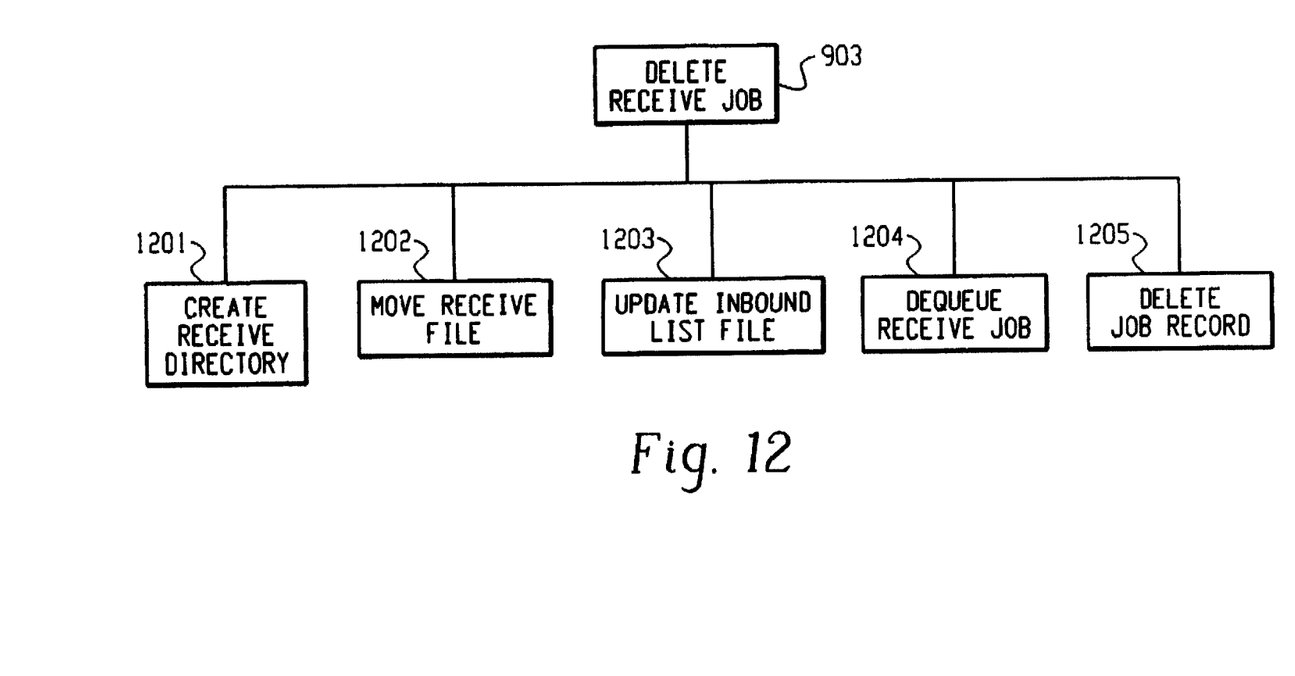
FIG. 12 is the block diagram of Delete Receive Job, which is responsible for deleting receive jobs when they are complete.

FIG. 12 is a detailed block diagram of Delete Receive Job (903). This module deletes job records and processes a newly received file within Pending Files (205). It is composed of five components: Create Receive Directory (1201), Move Receive File (1202), Update Inbound List File (1203) Dequeue Receive Job (1204) and Delete Job Record (1205).

Create Receive Directory (1201) utilizes the header information from the open sequence to determine a directory name. If this directory exists, then the file is moved into this directory using Move Receive File (1202). If this directory does not exist, then Create Receive Directory (1201) creates this directory and Move Receive File (1202) moves the file into this new directory. One skilled in the art would appreciate that the directory name may be the address of the sending system.

Update Inbound List File (1203) is called to append the received file and its path to a file containing a sequential list of all received files. In the preferred embodiment, this feature may be selected by the user.

Dequeue Receive Job (1204) searches site queues for all job records attempting to match the current receive job record. When the current job record is located, the job record is dequeued from the linked list. Delete Job Record (1205) is called to return the allocated structure memory to main memory.

Figure 13:
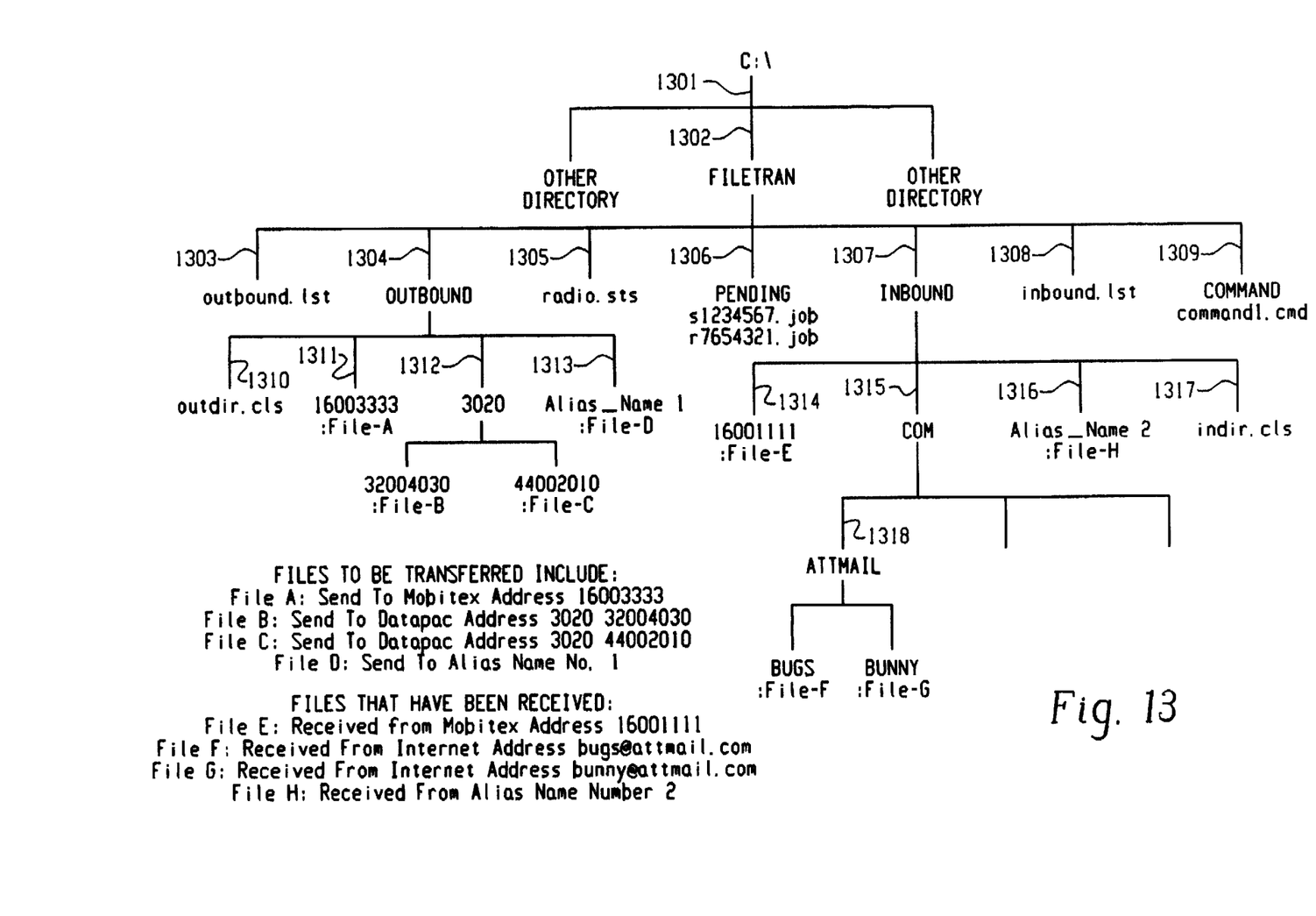
FIG. 13 is a block diagram of a directory tree structure showing one possible embodiment of the invention.

FIG. 13 is an overview of the directory structure of the invention. In its preferred form, the system is installed in the root directory (1301) of the storage device being used. Those skilled in the art will appreciate that in an MS-DOS™-based operating system the root directory could be "C:\" or "T:\" for al local disk drive on a network. In other systems the root directory for the disk where the system resides could be 1:\ or 2:\ for example. In FIG. 13, the name FILETRAN (1302) refers to the entry point into the directories supported by the invention. It should be appreciated by one of ordinary skill in the art that the directory and subdirectory could be structured in a number of ways to meet particular needs of the system user.

Within FILETRAN (1302) in the preferred embodiment are four first-level subdirectories and three status files. The three status files include radio.sts (1305), which contains radio and network information for programs to access; outbound.lst (1303), which is a list of all files, including the location of each file (for example the path), to be transmitted in sequential first-in, first-out order; and inbound.lst (1308), which is a list of all files, including the location of each file (for example the path), that have been received by the invention. The four subdirectories are OUTBOUND (1304), which contains all files to be transmitted; INBOUND (1304), which contains all files that have been received; PENDING (1306), which contains all files that are currently in a state of being transmitted or received; and COMMAND (1309), which contains all command files for transmitting.

As FIG. 13 illustrates by way of example, OUTBOUND (1304) contains three different classes of subdirectories and one outdir.cls (1310) configuration file. The outdir.cls (1310) file contains information associating a class or network type with each subdirectory name. It would be well-known to one of ordinary skill in the art to utilize the information in the outdir.cls (1310) to select automatically the network parameters and protocols necessary to complete file transmission of a file using the invention. Alternatively, a simple interface to permit a user to select from several network-dependent versions of the invention could also be easily constructed. It would be appreciated by one of ordinary skill in the art that among the many applications the indir.cls would support could be to permit the identification of a directory to be of a certain network type/class. In FIG. 13, the subdirectory labelled 16003333 (1311) contains a file called "File-A" to be transmitted to a location whose address is Mobitex™ Access Number 16003333. The second subdirectory 3020 (1312) represents a DATAPAC 3020 subdirectory covering two lower-level subdirectories for files to be transmitted to DATAPAC addresses 32004030 and 44002010. The third directory, Alias__Name 1 (1313) represents an alias name for a destination address or a set of destination addresses. An additional aspect of the invention translates the alias name to its corresponding network address or list of network addresses.

Within PENDING (1306) is an example of a pending file that is in the process of being sent. The filename s1234567.job contains the send direction ("s") and the job number ("1234567") for this pending file. The job number is a large integer to ensure that duplicate filenames will not occur in this directory. Also within PENDING (1306), is the filename r7654321.job containing the receive direction ("r") and the job number ("7654321") for this pending file.

Within the INBOUND (1307) directory are examples for three different classes of subdirectories and one indir.cls (1317) configuration file. The indir.cls (1317) file contains information association a class or network type with each subdirectory name. In FIG. 13, the subdirectory 16001111 (1314) contains a file called "File-E" that has been received from a location whose address is Mobitex Access Number 16001111. The second subdirectory COM (1315) represents a Internet address or domain with one example sub-address. The example sub-address is ATTMAIL (1318) that acts as the Internet site name and two sub-directories to ATTMAIL (1318) are BUGS and BUNNY both user names in that site. Internet addresses generally have the form: "User@SITE.DOMAIN" when mail is being send or received over Internet. The final example subdirectory is Alias__Name 2 (1316). This name represents a alias for an actual network address. When received from a network site, the invention converts the actual network address to the alias name that the application is expecting.

The COMMAND (1309) directory is used to hold command files prepared by applications wanting the invention to transmit information to a remote site. All files in this directory have the filename extension ".CMD" as the example file labelled "command1.cmd" illustrates.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method for transmitting one or more source transmission files between a computer and one or more transmission destinations via a communication network, wherein the computer is executing one or more application programs that generate the source transmission files, the method comprising the steps of:

the one or more application programs storing the one or more source transmission files in an outbound file area in the computer;

scanning the outbound file area to detect the one or more source transmission files and if detected, then selecting one or more selected transmission files from among the one or more source transmission files;

deriving for each selected transmission file and associating with such selected transmission file at least one destination address for each of one or more target destinations to which the selected transmission file is to be transmitted, wherein each target destination is selected from among the one or more transmission destinations; and transmitting each selected transmission file to each target destination associated with such selected transmission file based on the destination address of the target destination.

2. The method of claim 1, wherein at least one of the one or more transmission destinations is remote from the location of the outbound file area.

3. The method of claim 2, wherein the transmitting step occurs in a wireless communications environment.

4. The method of claim 3 wherein the scanning and selecting step includes a step of validating each selected transmission file to determine whether such selected transmission file may be transmitted to at least one of the one or more transmission destinations.

5. The method of claim 4 wherein the scanning and selecting step further includes, as a part of the selecting portion of such step, the step of transferring each source transmission file that is to be selected as one of the one or more selected transmission files to a pending file area, creating thereby each selected transmission file, wherein each selected transmission file that is transmitted in the transmitting step is transmitted from the pending file area.

6. The method of claim 1, wherein prior to the scanning step the method further comprises a step of searching an outbound file list containing one or more designations of one or more source transmission files that are to be transmitted, and upon detecting a file name and path in the outbound file list, focusing the scanning step to the portion of the outbound file area that is associated with such file name and path.

7. The method of claim 5, wherein a single selected transmission file is created from any one particular source transmission file.

8. The method of claim 5, wherein the deriving and associating step associates for any one particular selected transmission file only one target destination.

9. The method of claim 5, wherein each of the one or more selected transmission files is transmitted sequentially.

10. The method of claim 9, wherein the transmitting step includes the steps of detecting whether a particular target destination of the one or more target destinations associated with a particular selected transmission file of the one or more selected transmission files can accept a transmission; and upon determining that the particular target destination can accept a transmission, establishing a session with such target destination and sending the particular selected transmission file to such target destination.

11. The method of claim 10, wherein after a session is established and the transmitting of the particular selected transmission file is complete, the transmission step includes the steps of determining whether another selected transmission file is associated with the particular target destination;

upon determining that such another selected transmission file is so associated, keeping the session open; and sending the another selected transmission file to the particular target destination.

12. The method of claim 11, wherein the transmitting step repeats each of the determining, keeping and sending steps until, for the particular target destination, each selected transmission file that is associated with the particular target destination and that remains to be sent to the particular target destination during the session is transmitted.

13. The method of claim 5, wherein the outbound file area comprises one or more subareas.

14. The method of claim 13, wherein the one or more subareas includes a command file subarea.

15. The method of claim 13, wherein the one or more subareas includes an outbound directory file subarea.

16. The method of claim 13, wherein the one or more subareas includes an outbound subdirectory file subarea.

17. The method of claim 15, wherein at least one source transmission file of the one or more source transmission files is detected in the outbound directory file subarea and further wherein at least one of the source transmission files detected in the outbound directory file subarea contains a header from which is derived one or more target destinations associated with a particular selected transmission file.

18. The method of claim 16, wherein at least one source transmission file of the one or more source transmission files is detected in the outbound subdirectory file subarea, and further wherein for at least one selected transmission file whose source transmission file was detected in the outbound subdirectory file subarea, the target destination is derived from such source transmission file's subdirectory path name.

19. The method of claim 15, wherein the outbound directory file subarea includes an outbound subdirectory file area.

20. The method of claim 2, further including a step of establishing a status file reflecting the status of the wireless communications environment.

21. The method of claim 1, further including a step of providing for each selected transmission file an indication of whether such selected transmission file was successfully received.

22. The method of claim 21, wherein the indication further includes an additional indication of whether such selected transmission file was successfully logged at the target destination associated with such selected transmission file to a disk drive or to memory.

23. The method of claim 22, further including a step of deleting references to each selected transmission file for which is received, as a result of the indicating step, an indication that such selected transmission file was successfully received.

24. The method of claim 1, wherein the scanning step is initiated periodically.

25. The method of claim 1, wherein the scanning step is initiated by a message sent by an application.

26. The method of claim 24, wherein a user-specified period determines how frequently the scanning step is initiated.

27. The method of claim 1 including as a first step, an initiating step, wherein a user initiates a message to begin scanning, and further wherein the scanning step begins upon receipt of such message.

28. The method of claim 1, wherein the deriving step includes for each selected transmission file a step of examining a command file associated with such selected transmission file to extract therefrom at least one target destination.

29. The method of claim 1, wherein the deriving step includes for each selected transmission file a step of keyword scanning such selected transmission file to extract therefrom at least one keyword designating at least one target destination.

30. The method of claim 5, wherein the deriving step further includes the step of creating for at least one transmission file and associated target destination pair a job record associated with such pair.

31. A method for facilitating the transfer of one or more electronic data files generated by one or more application programs executing at a first location to one or more different locations, the method comprising the steps of establishing a first storage area for storing one or more of the electronic data files as outbound files, wherein the first storage area includes a set of subareas for storing each outbound file that is to be transferred to one of the one or more different locations, each subarea having a subarea name that identifies the subarea;

the one or more application programs executing at the first location then storing each outbound file that is to be transferred in one or more of the subareas;

scanning the first storage area to determine whether any files to be transmitted are stored in the set of subareas;

deriving the addresses for the one or more different locations from the subarea names associated with the files stored in the set of subareas; and transferring at least one outbound file to the one or more different locations using each address derived from the subarea names.

32. The method of claim 31 further comprising, as part of the establishing step, the step of associating with the first storage area an outbound file area name.

33. The method of claim 32, wherein the first storage area is accessed via an outbound file area directory, and further wherein the first storage area and the outbound file area directory share the outbound file area name.

34. The method of claim 32, wherein the first storage area is accessed via an outbound area subdirectory, and further wherein the first storage area and the outbound area subdirectory share the outbound file area name.

35. The method of claim 34, wherein the subarea is accessed via a lower level subdirectory located one or more levels under the outbound file area subdirectory.

36. The method of claim 35, wherein the lower level subdirectory is labeled with the subarea name.

37. A system for enabling the receipt and transmission of at least one data file between a host and a destination system connected to a network, comprising:

a host system, wherein such host system has associated therewith a host system transmitter and a first storage area, and wherein the host system is executing one or more application programs that generate said at least one data file;

a destination system, wherein such destination system has associated therewith a destination system receiver and a second storage area; and a file transfer agent executing on the host system, said file transfer agent forming an interface between the one or more application programs and the network, and further comprising a message manager, a send file manager and a receive file manager, wherein the file transfer agent facilitates transmission of the data file between the first storage area and the second storage area by:

scanning the first storage area to detect whether the at least one data file is stored in the first storage area, the presence of such data file indicating that it is to be transmitted to said destination system;

deriving a destination address of said destination system from information associated with the data file and transmitting the data file to the second storage area within the destination system using the derived destination address.

38. The system of claim 37, wherein the host system transmitter is provided by a host-based modem.

39. The system of claim 37, wherein the destination system receiver is provided by a destination-based modem.

40. The system of claim 37, wherein the destination system further includes a destination system transmitter and wherein the host system further includes a host system receiver.

41. The system of claim 40, wherein the destination system transmitter is provided by a destination-based modem and the host system receiver is provided by a host-based modem.

42. The system of claim 41, wherein at least one modem of the destination-based modem and the host-based modem operates in at least one mode of a wireless transmission mode or a wireless receive mode.

43. The system of claim 37, wherein the host system and the destination system are connected via a local area network.

44. The system of claim 37, wherein the host system and the destination system are physically located remotely from each other.

45. The system of claim 44, wherein the send file manager includes:

means for scanning the first storage area to detect one or more source transmission files;

means for selecting one or more selected transmission files from among the one or more source transmission files;

means for deriving for each selected transmission file and associating with such selected transmission file at least one destination address for each target destination to which the selected transmission file is to be transmitted; and means for transmitting each selected transmission file to each target destination that the means for deriving has associated with such selected transmission file.

46. The system of claim 44, wherein the receive file manager includes:

means for detecting an open new connection request;

means for accepting the open new connection request and establishing as a result of such request a communication connection between the host system and the destination system;

means for receiving data transmitted from the destination system over the communication connection and transferring at least a portion of the data to one or more receiving files;

means for validating the data and for determining whether all the data that was transmitted was received; and means for transferring at least one receiving file to a location that is addressed by a location designator derived from some portion of the data transmitted from the destination system.

47. The system of claim 37, wherein the first storage area is physically located other than proximate to the host system.

48. The system of claim 37, wherein the second storage area is physically located other than proximate to the destination system.

49. A method of providing a standard, seamless interface between one or more application programs executing on a first computer and a telecommunications network, the method comprising the steps of:

storing an application-generated data file in a storage area on the first computer;

scanning the storage area to detect whether a particular data file is stored in the storage area, the presence of the particular data file indicating that it is to be transmitted from the first computer to at least a second computer;

deriving at least one destination address for each second computer to which the particular data file is to be transmitted; and transmitting the particular data file over the telecommunications network to one or more destination addresses.

50. The method of claim 49, wherein the deriving step further includes the step of determining a protocol type associated with the telecommunication network and wherein the transmitting step transmits the particular set of data in accordance with that protocol type.

51. The method of claim 49, wherein the at least one address for each second computer to which the particular data file is to be transmitted in derived from a set of command data associated with the particular data file.

52. The method of claim 49, wherein the at least one address for each second computer to which the particular data file is to be transmitted in derived from a header contained within the particular data file.

53. The method or claim 49, wherein the at least one address for each second computer to which the particular data file is to be transmitted is derived from a designator associated with a storage location where the particular data file is stored.

54. A method of transferring data files between one or more application programs executing on a first computer system and one or more application programs executing on a second computer system via a communication network, the first and second computer systems having network addresses that describe their respective locations on the network, the method comprising the steps of:

(a) one of the one or more application programs executing on the first computer system writing a data file to an outbound file storage area within the first computer system, the outbound file storage area having a directory structure;

(b) scanning the outbound file storage area to detect the presence of the data file;

(c) deriving the network address of the second computer system from the directory structure of the outbound file storage area where the data file is stored, and moving the data file from the outbound file storage area to a pending file storage area; and (d) transmitting the data file from the pending file storage area to the second computer system via the communication network using the derived network address of the second computer system.

55. The method of claim 54, wherein the transmitting step further includes the step of including the network address of the first computer system within the transmitted date file.

56. The method of claim 55, further including the steps of:

(e) receiving the data file at the second computer system;

(f) providing a second storage area within the second computer system, the second storage area having a directory structure including sub-directories; and (g) storing the received data file in a sub-directory corresponding to the network address of the first computer system.

57. The method of claim 56, further including the steps of:

(h) detecting the presence of the received data file in the second storage area; and (I) reading the data file from the second storage area using one of the one or more application programs executing on the second computer system.

58. The system of claim 37, wherein the information associated with the data file is a set of command data.

59. The system of claim 37, wherein the information associated with the data file is a header contained within the data file.

60. The system of claim 37, wherein the information associated with the data file is a file structure associated with the first storage area where the data file is stored.

* * * * *